US009415701B2

United States Patent
Wrong et al.

(10) Patent No.: US 9,415,701 B2
(45) Date of Patent: Aug. 16, 2016

(54) POSITIVELY ENGAGED LATCH FOR SEAT ADJUSTER ASSEMBLY

(75) Inventors: David J. Wrong, Newmarket (CA); Prasad D. Jagtap, Farmington, MI (US)

(73) Assignee: Magna Seating Inc., Aurora, Ontario (CA)

( * ) Notice: Subject to any disclaimer, the term of this patent is extended or adjusted under 35 U.S.C. 154(b) by 247 days.

(21) Appl. No.: 14/241,094

(22) PCT Filed: Aug. 22, 2012

(86) PCT No.: PCT/CA2012/000782
§ 371 (c)(1),
(2), (4) Date: Oct. 6, 2014

(87) PCT Pub. No.: WO2013/029150
PCT Pub. Date: Mar. 7, 2013

(65) Prior Publication Data
US 2015/0083881 A1      Mar. 26, 2015

Related U.S. Application Data

(60) Provisional application No. 61/527,681, filed on Aug. 26, 2011.

(51) Int. Cl.
*B60N 2/07*      (2006.01)
*B60N 2/08*      (2006.01)

(52) U.S. Cl.
CPC ............ *B60N 2/0825* (2013.01); *B60N 2/0705* (2013.01); *B60N 2/0715* (2013.01); *B60N 2/0722* (2013.01); *B60N 2/0843* (2013.01)

(58) Field of Classification Search
CPC .. B60N 2/0705; B60N 2/0715; B60N 2/0722; B60N 2/0825; B60N 2/0843; B60N 2/0806; B60N 2/0818

USPC ................... 248/429, 430; 74/527, 532, 533; 297/216.6
See application file for complete search history.

(56) References Cited

U.S. PATENT DOCUMENTS

| 5,816,110 | A | 10/1998 | Schuler et al. | |
|---|---|---|---|---|
| 6,764,054 | B2 * | 7/2004 | Becker | B60N 2/0707 248/424 |
| 7,165,753 | B2 | 1/2007 | Oh | |

(Continued)

FOREIGN PATENT DOCUMENTS

| DE | 3935359 | 5/1991 |
|---|---|---|
| DE | 19922626 | 12/2000 |

(Continued)

*Primary Examiner* — Tan Le
(74) *Attorney, Agent, or Firm* — Miller Canfield (57) ABSTRACT

A seat track assembly includes upper and lower tracks slidably coupled together. The lower track includes a locking window and the upper track includes a first aperture. A locking mechanism includes a mounting bracket fixedly secured to the upper track. The mounting bracket includes a second aperture. At least one pin is slidably guided by the second aperture for movement in and out of the locking window and first aperture for interlocking the upper and lower tracks. The pin includes opposite first and second sides and at least one of the sides includes a recess. The recess reduces a surface area of the respective side of the pin and defines upper and lower edges. The upper and lower edges of the recess lockingly engage with the upper and lower tracks in response to a dynamic impact to prevent withdrawal of the pin from the locking window and first aperture.

8 Claims, 7 Drawing Sheets

(56) References Cited

U.S. PATENT DOCUMENTS

| | | | |
|---|---|---|---|
| 7,207,541 B2 * | 4/2007 | Frohnhaus | B60N 2/0705 248/424 |
| 7,661,646 B2 | 2/2010 | Weber | |
| 7,931,246 B2 * | 4/2011 | Brewer | B60N 2/0705 248/429 |
| 9,067,514 B2 * | 6/2015 | Oh | B60N 2/0705 |
| 2008/0163717 A1 * | 7/2008 | Weber | B60N 2/0705 74/527 |
| 2014/0224954 A1 * | 8/2014 | Oh | B60N 2/0705 248/429 |
| 2015/0083881 A1 * | 3/2015 | Wrong | B60N 2/0705 248/429 |

FOREIGN PATENT DOCUMENTS

| | | |
|---|---|---|
| DE | 202004006420 | 9/2005 |
| DE | 102005058679 | 5/2007 |

\* cited by examiner

POSITIVELY ENGAGED LATCH FOR SEAT ADJUSTER ASSEMBLY

RELATED APPLICATIONS

This application claims priority to and all the benefits of U.S. Provisional Application No. 61/527,681, filed Aug. 26, 2011, and entitled "Positively Engaged Latch for Seat Adjuster Assembly".

BACKGROUND OF THE INVENTION

1. Field of the Invention

The present invention relates to a track assembly for a seat assembly of an automotive vehicle. More particularly, the present invention relates to a seat track assembly having a locking mechanism with a plurality of pins movable between a locked position for interlocking upper and lower tracks of the seat track assembly and an unlocked position disengaged from the tracks to allow sliding movement therebetween.

2. Description of Related Art

Automotive vehicles include seat assemblies for supporting occupants above a floor in the vehicle. Typically, a seat assembly includes a track assembly that is operatively coupled between the seat assembly and the floor of the vehicle and allows selective forward and rearward movement of the seat assembly relative to the floor. The track assembly typically includes a lower track and an upper track slidably engaged therewith, which allows the sliding movement of the seat assembly relative to the floor. Latch or locking mechanisms are commonly known in the art for interlocking the upper and lower tracks to prevent the forward and rearward movement of the seat assembly relative to the floor.

One type of locking mechanism known in the art utilizes a plurality of teeth or pins that engage one or more apertures or windows in the lower track to interlock the upper and lower tracks. Examples of these types of locking mechanisms are disclosed in U.S. Pat. Nos. 7,661,646; 6,892,995 and 6,322,036.

One disadvantage of these types of locking mechanisms is the teeth or pins are susceptible to withdrawing or back-driving from the windows in the lower track in response to a vehicle impact. More specifically, when the vehicle is involved in a crash, seat belt loads from an occupant tend to urge the upper track forward. The upper track then acts on the pins and in some instances, especially with tapered pins, the pins may withdraw or back-drive from the windows in the lower track allowing the upper track to slide forward.

It is desirable, therefore, to provide a seat track assembly having a locking mechanism that includes a plurality of pins that are adapted to prevent withdrawal or back-driving of the pins in the event of a vehicle impact.

SUMMARY OF THE INVENTION

According to one aspect of the invention, a seat track assembly for an automotive vehicle includes a lower track that is adapted to be fixedly secured to a floor in the vehicle and an upper track that is slidably coupled to the lower track. The lower track includes a plurality of locking windows and the upper track includes a plurality of first apertures. A locking mechanism includes a mounting bracket that is fixedly secured to the upper track. The mounting bracket also includes a plurality of second apertures. A plurality of pins is slidably guided by the second apertures of the mounting bracket for movement in and out of the locking windows and the first apertures for interlocking the upper and lower tracks. The pins include opposite first and second sides and each of the first and second sides have a recess. The recesses effectively reduce a surface area of the respective first and second sides of the pins. Each recess defines an upper and lower edge. The upper and lower edges of the recesses lockingly engage with at least one of the upper and lower tracks in response to a dynamic impact to prevent withdrawal of the pins from the locking window and the first aperture.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Referring to the Figures, wherein like numerals indicate like or corresponding parts throughout the several views, a track assembly for a seat assembly (not shown) of an automotive vehicle is generally shown at 10. The track assembly 10 includes a lower track 12 and an upper track 14. The lower track 12 is adapted to be fixedly secured to a floor in the vehicle. The upper track 14 is adapted to be fixedly secured to a bottom of a seat cushion (not shown) of the seat assembly. The upper track 14 is slidably coupled to the lower track 12 to allow selective forward and rearward movement of the seat cushion relative to the floor among a plurality of seating positions. Described in greater detail below, the track assembly 10 includes a latch or locking mechanism, generally shown at 16, for selectively interlocking the lower 12 and upper 14 tracks to releasably lock the seat cushion in any one of the plurality of seating positions.

Figure 2:
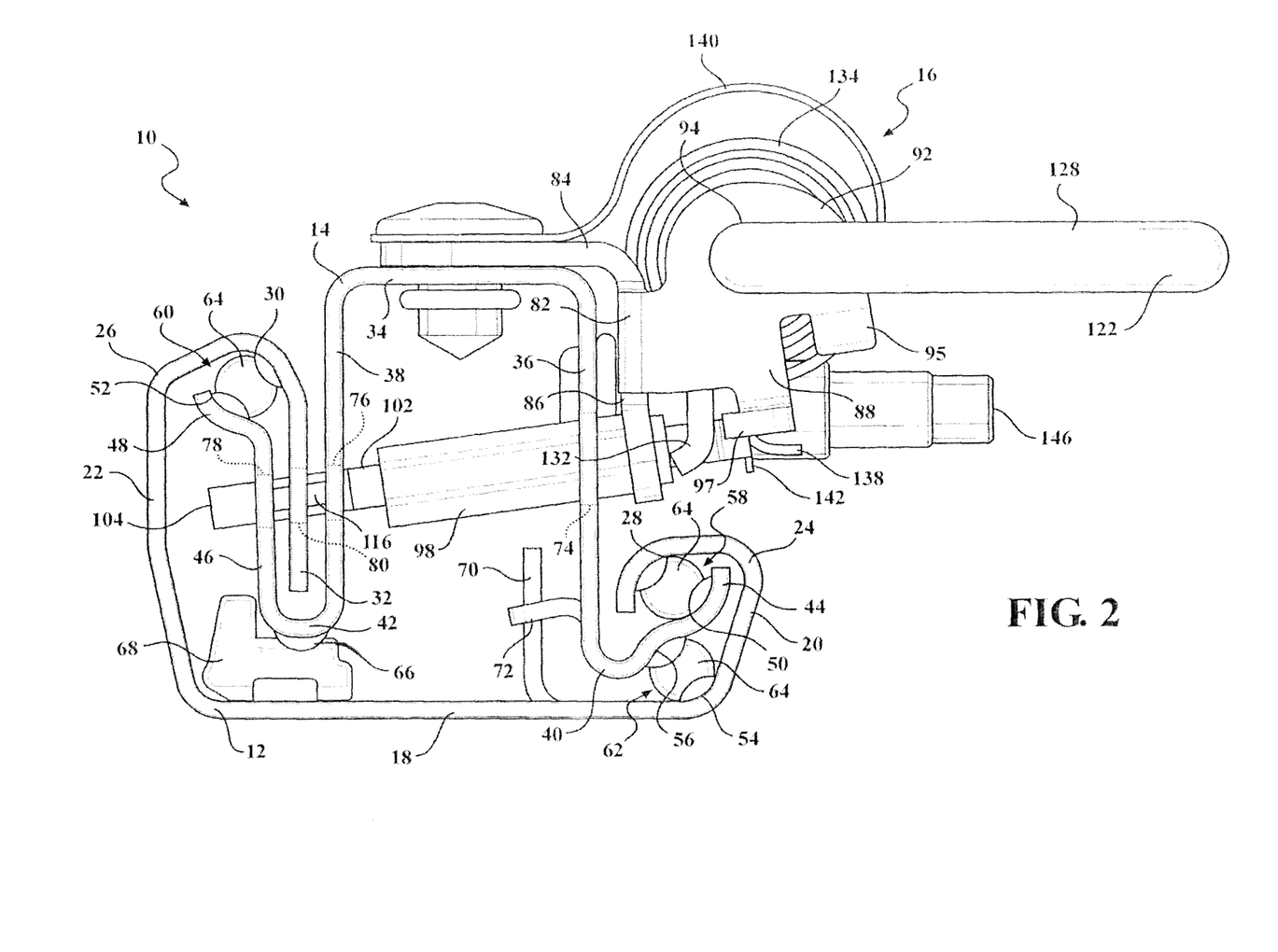
FIG. 2 is a cross-sectional view of the seat track assembly and locking mechanism of FIG. 1.

Referring specifically to FIG. 2, the lower track 12 has a generally U-shaped cross section defined by a lower web 18 extending laterally between generally upright inner 20 and outer 22 walls. Each of the inner 20 and outer 22 walls includes hooked portions 24, 26, respectively, that are turned laterally inward. Each of the hooked portions 24, 26 defines first and second arcuate upper bearing surface 28, 30. An outer flange 32 protrudes downwardly from the hooked portion 26 of the outer wall 22 toward the lower web 18. The outer flange 32 is generally parallel to and spaced apart from the outer wall 22.

The upper track 14 has a generally U-shaped cross section defined by an upper web 34 that extends laterally between generally upright first 36 and second 38 walls. Each of the first 36 and second 38 walls includes hooked ends 40, 42 that are turned laterally outwardly. The hooked end 40 of the first wall 36 includes a first distal wall 44 that extends upwardly toward the hooked portion 24 of the inner wall 20 of the lower track 12. A second distal wall 46 extends upwardly from the hooked end 42 of the second wall 38 toward the hooked portion 26 of the outer wall 22, such that the outer flange 32 is disposed between the second wall 38 and the second distal wall 46. The second distal wall 46 includes an outwardly flared or bent end 48. First and second arcuate lower bearing surfaces 50, 52 are defined by the first distal wall 44 and by the bent end 48 of the second distal wall 46, respectively.

In addition, the lower track 12 defines a third arcuate lower bearing surface 54 at the transition between the lower web 18 and the inner wall 20. The hooked end 40 of the first wall 36 of the upper track 14 defines a third arcuate upper bearing surface 56. Each of the lower bearing surfaces 50, 52, 54 opposes the respective upper bearing surfaces 28, 30, 56 to define generally cylindrical bearing spaces 58, 60, 62 therebetween. Preferably, the lower bearing surfaces 50, 52, 54 are angled inwardly to promote centering of the upper track 14 relative to the lower track 12.

A plurality of ball bearings 64 is disposed in the bearing spaces 58, 60, 62. A plurality of roller bearings 66 held by a roller carriage 68 is supported between the hooked end 42 of the upper track 14 and the lower web 18 of the lower track 12. The ball bearings 64 and roller bearings 66 reduce friction during sliding adjustment of the upper track 14 relative to the lower track 12. Preferably, the ball bearings 64 and roller bearings 66 are offset longitudinally to allow elastic deflection between and prevent binding of the lower 12 and upper 14 tracks under heavy loads. Travel stops 70, 72 are incorporated into each of the lower 12 and upper 14 tracks, respectively, to define limits of forward and rearward movement of the seat cushion.

A generally rectangular cutout 74 is formed in and extends longitudinally along the first wall 36 of the upper track 14. A plurality of first apertures 76 is formed in and disposed longitudinally along the second wall 38 of the upper track 14. The first apertures 76 are evenly spaced apart and aligned opposite from the cutout 74. A plurality of second apertures 78 is formed in and disposed longitudinally along the second distal wall 46 of the upper track 14. The second apertures 78 are evenly spaced apart and are generally aligned with the first apertures 76. A plurality of locking windows 80 is formed in and disposed longitudinally along the outer flange 32 of the lower track 12.

Referring to FIGS. 1-4, the locking mechanism 16 is operatively coupled between the lower 12 and upper 14 tracks for releasably interlocking the lower 12 and upper 14 tracks. More specifically, the locking mechanism 16 includes a mounting bracket 82 having an upper portion 84 adapted to be fixedly secured to the upper web 34 of the upper track 14 and a lower portion 86 extending downwardly from the upper portion 84. The lower portion 86 is disposed adjacent to the first wall 36 of the upper track 14 when the upper portion 84 is fixedly secured to the upper web 34. The mounting bracket 82 extends longitudinally between first 88 and second 90 ends and an arm 92 extends outwardly from each of the first 88 and second 90 ends in a direction opposite the upper portion 84. A bore 94 is formed in each arm 92. The bores 94 are coaxial and define a pivot axis 96. Each arm 92 also includes an inner tab 95 and an outer tab 97. A plurality of third apertures (not shown in the first embodiment) is formed in the lower portion 86 of the mounting bracket 82 between the first 88 and second 90 ends thereof. In the first embodiment, a retainer 98 is fixedly secured to the lower portion 86 of the mounting bracket 82. The retainer 98 includes a plurality of fourth apertures 100 that extend from and correspond with the third apertures. When the mounting bracket 82 is fixedly secured to the upper track 14, the retainer 98 extends through the cutout 74 in the first wall 36 of the upper track 14 toward the second wall 38 such that the fourth apertures 100 are generally aligned with the first 76 and second 78 apertures. The retainer 98 may be made from any polymer or another suitable material without varying from the scope of the invention.

Figures 4, 5:
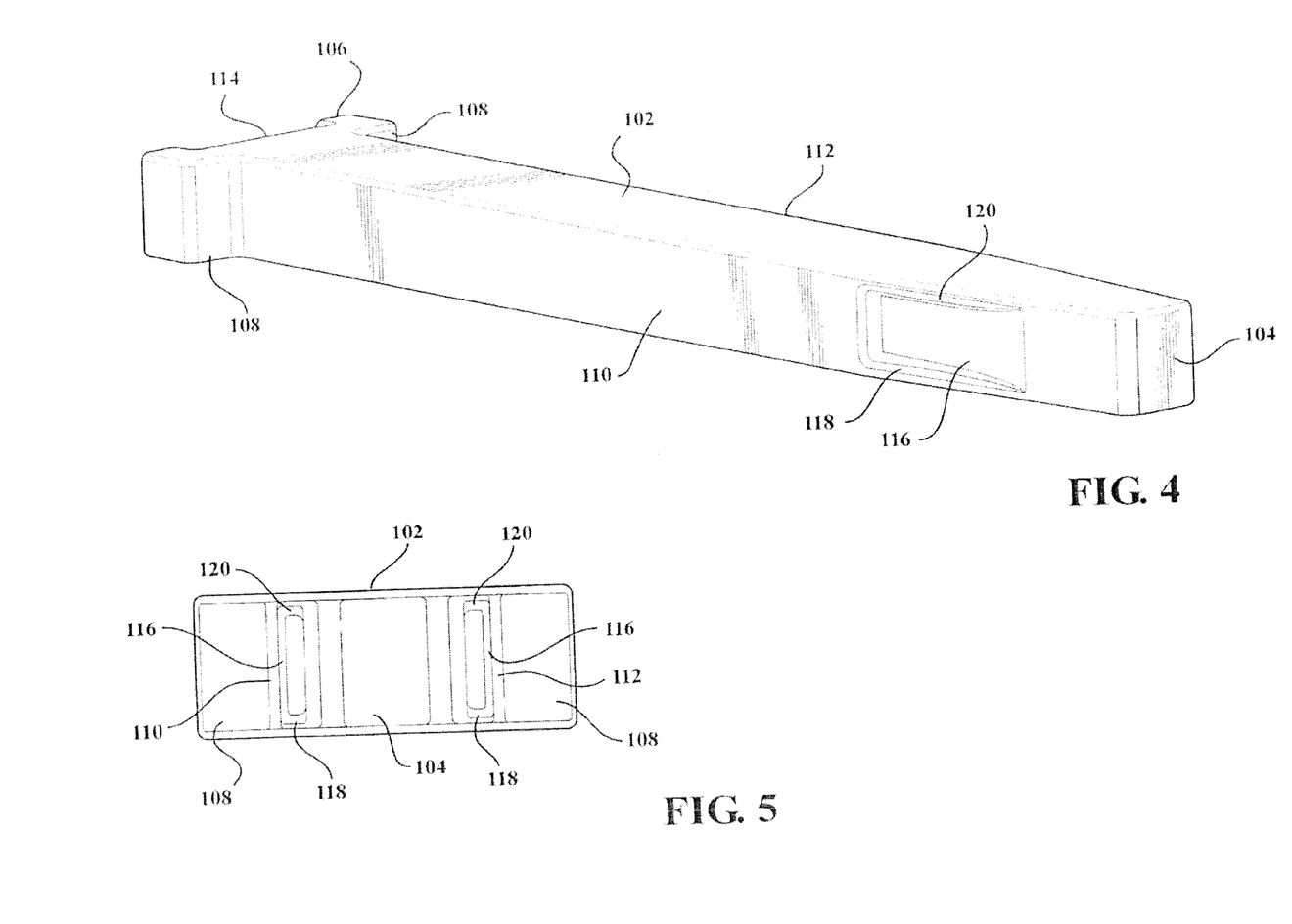
FIG. 4 is a perspective view of a pin of the locking mechanism.
FIG. 5 is an end view of the pin.

The locking mechanism 16 further includes a plurality of pins 102 that is slidably supported by the third and fourth 100 apertures. There are six pins 102 shown in the current embodiment, however, it is appreciated that any number of pins 102 may be used without varying from the scope of the invention. As best shown in FIG. 4, each pin 102 extends longitudinally between opposite first 104 and second 106 ends. Preferably, the first end 104 of each pin 102 is tapered to facilitate movement of each pin 102 in and out of engagement with the locking window 80 and the second aperture 78. The second end 106 of each pin 102 includes an abutment edge 108 extending outwardly from opposite first 110 and second 112 sides of the pin 102. The abutment edges 108 face the first end 104 of the pin 102. The second end 106 also includes an indentation 114. Each pin 102 also includes a recess 116 formed in each of the first 110 and second 112 sides. The recesses 116 are disposed generally adjacent the first end 104 of the pin 102 and define lower 118 and upper 120 edges. The recesses 116 are adapted to prevent the pins 102 from backdriving under load. In other words, the recesses 116 prevent the lower 12 and upper 14 tracks from unlocking in the event of a dynamic impact or collision.

Figure 3:
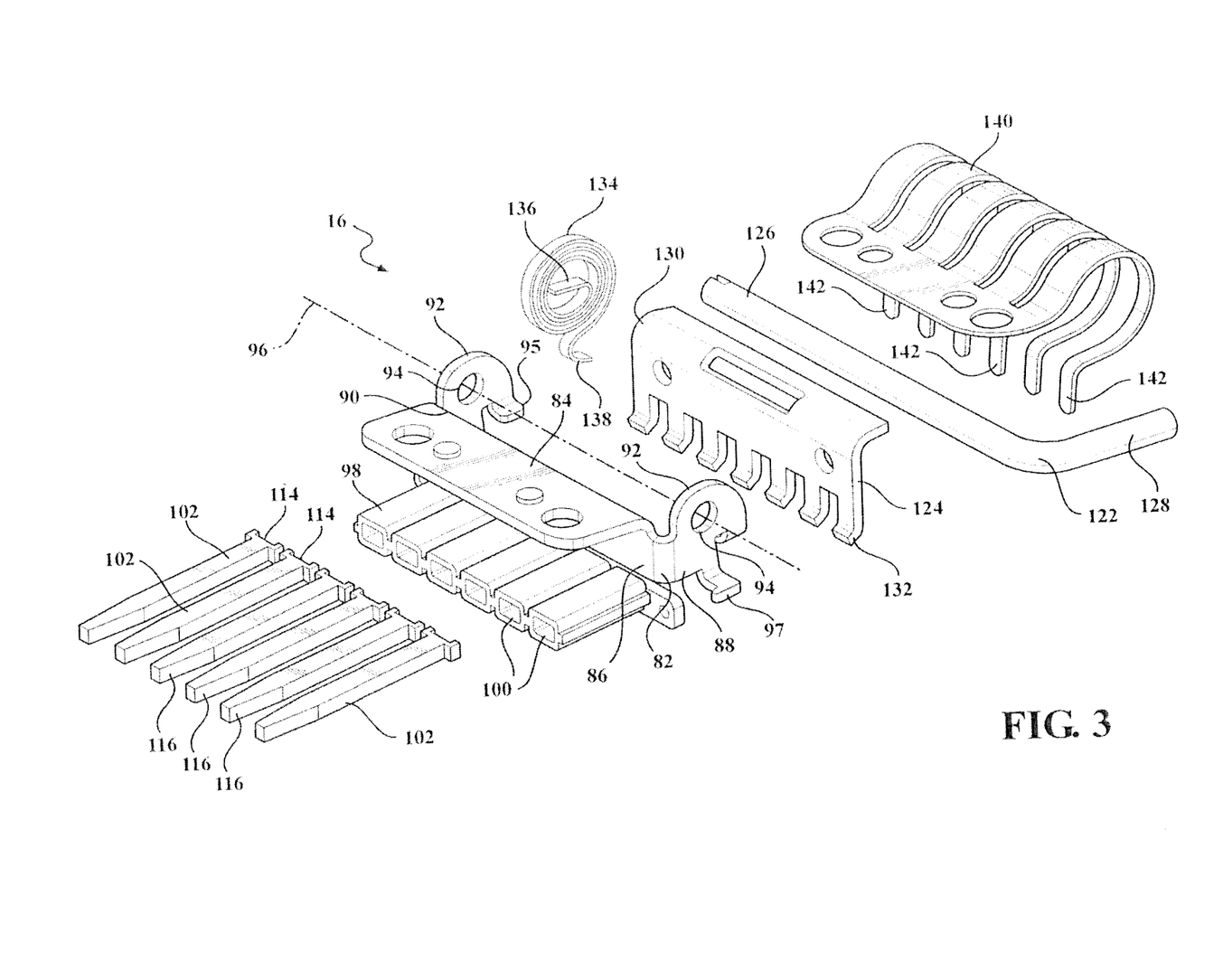
FIG. 3 is an exploded perspective view of the locking mechanism of FIG. 1.

The locking mechanism 16 also includes an actuator rod 122 and an actuator lever 124. The actuator rod 122 includes a first portion 126 and a second portion 128 extending orthogonally therefrom. The first portion 126 extends longitudinally through the bores 94 of the arms 92 on the mounting bracket 82 and is rotatably coupled to the mounting bracket 82 for rotational movement about the pivot axis 96. The actuator lever 124 includes an upper end having a curved portion 130 that is captured between the first portion 126 of the actuator rod 122 and the mounting bracket 82 such that the actuator lever 124 is operatively coupled to the mounting bracket 82 for pivotal movement about the pivot axis 96 between locked and unlocked positions in response to rotation of the actuator rod 122. The actuator lever 124 also includes a lower end having a plurality of actuator fingers 132 that is adapted for moving the pins 102 away from engagement with the locking windows 80. The actuator fingers 132 are evenly spaced apart and each actuator finger 132 engages the abutment edge 108 of at least one pin 102. It is appreciated that the actuator fingers 132 that are disposed between adjacent pins 102 engage the abutment edge 108 on each of the adjacent pins 102. The actuator lever 124 further includes an angled leg (not shown in the first embodiment) at each end thereof. The angled legs abut the inner tabs 95 on the mounting bracket 82 thereby acting as an end of travel stop for the actuator lever 124 in the unlocked position.

A clock spring 134 biases the actuator rod 122 in a first direction (clockwise when viewed from FIG. 2), which urges the actuator lever 124 toward the locked position. In the locked position, the actuator fingers 132 are biased toward the lower portion 86 of the mounting bracket 82. The clock spring 134 is disposed adjacent to the arm 92 at the second end 90 of the mounting bracket 82 and extends between a first end 136 and a second end 138. The first end 136 of the clock spring 134 is secured to an end of the first portion 126 of the actuator rod 122 and the second end 138 is engaged with the outer tab 97 extending from the arm 92 on the mounting bracket 82.

Rotation of the actuator rod 122 in a second direction (counterclockwise when viewed from FIG. 2) pivots the actuator lever 124 about the pivot axis 96 toward the unlocked position, which causes the actuator fingers 132 to push against the abutment edges 108 on the pins 102, thereby moving the pins 102 away from engagement with the locking windows 80.

The locking mechanism 16 also includes a leaf spring 140. The leaf spring 140 is fixedly secured to the upper portion 84 of the mounting bracket 82, which in turn is fixedly secured to the upper web 34 of the upper track 14. The leaf spring 140 includes a plurality of fingers 142 that is adapted for biasing the pins 102 towards engagement with the locking windows 80. Specifically, the fingers 142 are evenly spaced apart and each finger 142 engages the indentation 114 in the second end 106 of one of the pins 102, thereby biasing the pins 102 towards engagement with the locking windows 80.

Figure 1:
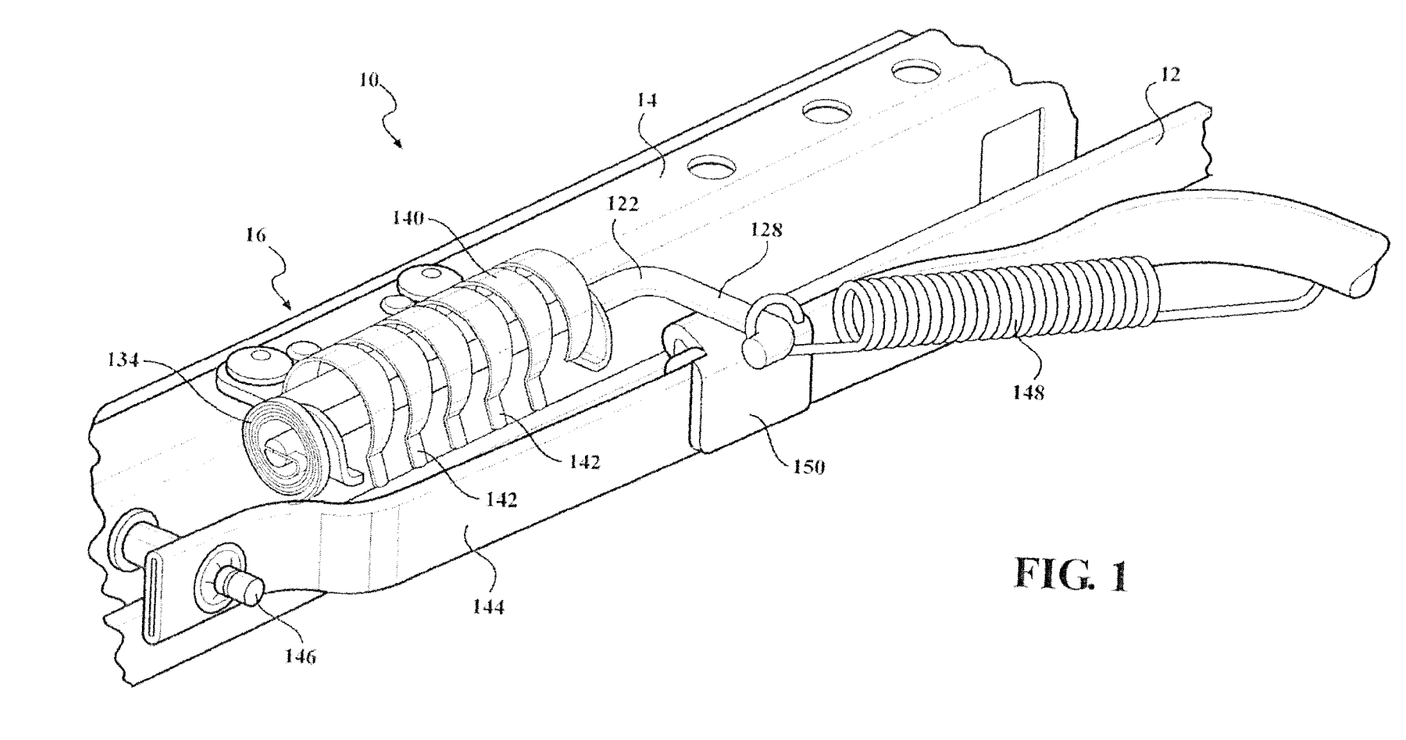
FIG. 1 is a fragmentary perspective view of a seat track assembly with a locking mechanism according to one embodiment of the invention.

As shown in FIG. 1, a "towel bar" or handle 144 is pivotally coupled to the upper track 14 by a pivot pin 146. The handle 144 is supported in a use position by an extension spring 148 that is coupled between the second portion 128 of the actuator rod 122 and the handle 144. The handle 144 includes a keeper 150 fixedly secured thereto. The keeper 150 engages the second portion 128 of the actuator rod 122 during manual actuation of the handle 144 to rotate the actuator rod 122 in the second direction to facilitate movement of the actuator lever 124 from the locked position to the unlocked position. The handle 144 is removed for clarity in FIG. 2.

All of the pins 102 are slidably supported by the first apertures 76 of the upper track 14 as the pins 102 are moved in and out of the locking windows 80 by the leaf spring 140 and pivotal movement of the actuator lever 124 between the locked and unlocked positions, respectively. Preferably, the pins 102 and locking windows 80 are sized and spaced so that, in the locked position, at least four out of six of the pins 102 are forced by the leaf spring 140 through the locking windows 80 to prevent forward and rearward movement of the upper track 14 relative to the lower track 12. Most preferably, the pins 102 in the locked position are received through the locking windows 80 and supported by the first 76 and second 78 apertures, so that the pins 102 are in a double shearing condition under loading of the upper track 14 relative to the lower track 12. More specifically, with the pins 102 extending through the locking windows 80 in the lower track 12 and extending through each of the first 76 and second 78 apertures of the upper track 14, any forces exerted upon the seat assembly and passing through the pins 102 are transferred through and supported by the outer flange 32 of the lower track 12 and both the second wall 38 and second distal wall 46 of the upper track 14 to provide extra load support and secure locking between the lower 12 and upper 14 tracks.

In some instances, such as certain dynamic impacts or collisions, the pins 102 may have a tendency to withdraw or back-drive against the bias of the leaf spring 140 out of engagement with the lower 12 and upper 14 tracks. However, the recesses 116 and the material of the pins 102 are designed to prevent this from occurring. The recesses 116 effectively reduce the surface area of the first 110 and second 112 sides of the pins 102 at the location where the pins 102 extend through the locking windows 80 and first 76 and second 78 apertures. In addition, it is contemplated that the pins 102 are made from a material with a hardness that is greater than a hardness of the lower 12 and upper 14 tracks. Therefore, in response to a dynamic impact, the lower 118 and upper 120 edges of the recesses 116 "bite" into or lockingly engage the outer flange 32 of the lower track 12 and the second wall 38 and second distal wall 46 of the upper track 14 to prevent back-driving of the pins 102. In other words, the force applied by the lower 118 and upper 120 edges of the recesses 116 to the edges of the locking windows 80 and the edges of the first 76 and second 78 apertures causes the edges of the locking windows 80 and the edges of the first 76 and second 78 apertures to deform, which prevents the pins 102 from withdrawing from the locking windows 80 and the first 76 and second 78 apertures.

In operation, the upper track 14 can be adjusted relative to the lower track 12 by unlocking the locking mechanism 16. Manual actuation of the handle 144 rotates the actuator rod 122 in the second direction which pivots the actuator lever 124 about the pivot axis 96 to the unlocked position. As the actuator lever 124 pivots toward the unlocked position, the actuator fingers 132 pull the pins 102 laterally against the force of the leaf spring 140. When the first ends 104 of the pins 102 have exited the locking windows 80, the upper track 14 is forwardly or rearwardly slidable relative to the lower track 12. The actuator lever 124 must be maintained in the unlocked position by the handle 144 while the upper track 14 is adjusted relative to the lower track 12.

After the upper track 14 has been adjusted to a desired position, the handle 144 is released and the clock spring 134 forces the actuator rod 122 in the first direction which returns the actuator lever 124 to the locked position. Simultaneously, the leaf spring 140 forces the pins 102 toward engagement with the locking windows 80 and the second apertures 78. As described above, at least four of the pins 102 engage the locking windows 80 and the second apertures 78 to lock the upper track 14 in the desired position relative to the lower track 12.

Figure 6:
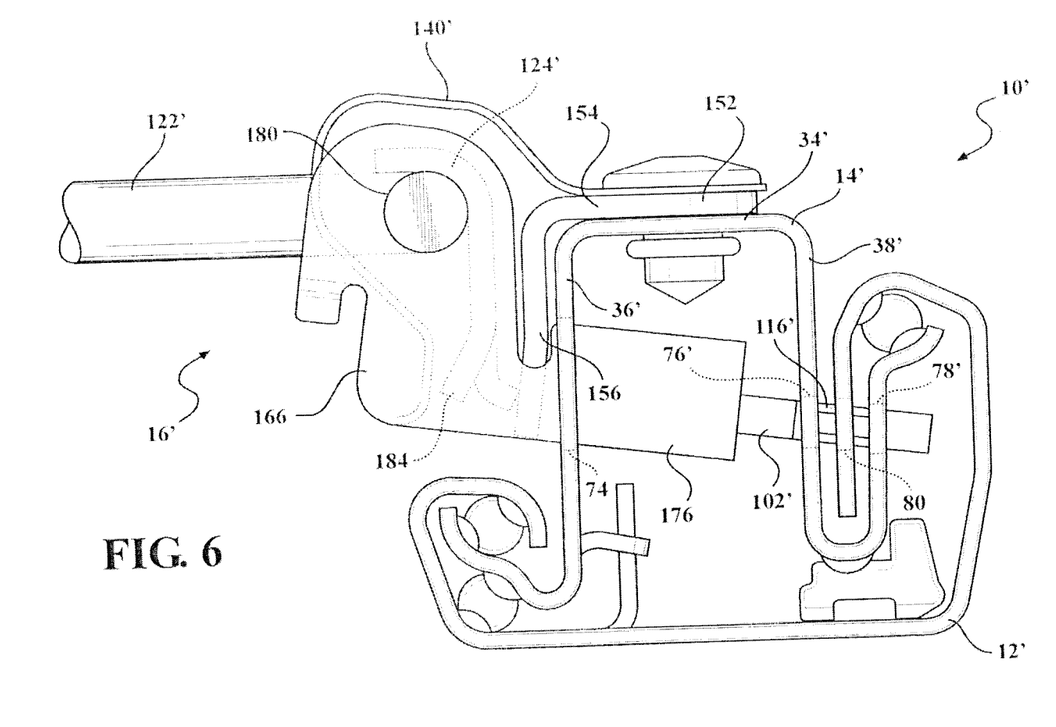
FIG. 6 is a cross-sectional view of the seat track assembly and a locking mechanism according to a second embodiment of the invention.
Figure 7:
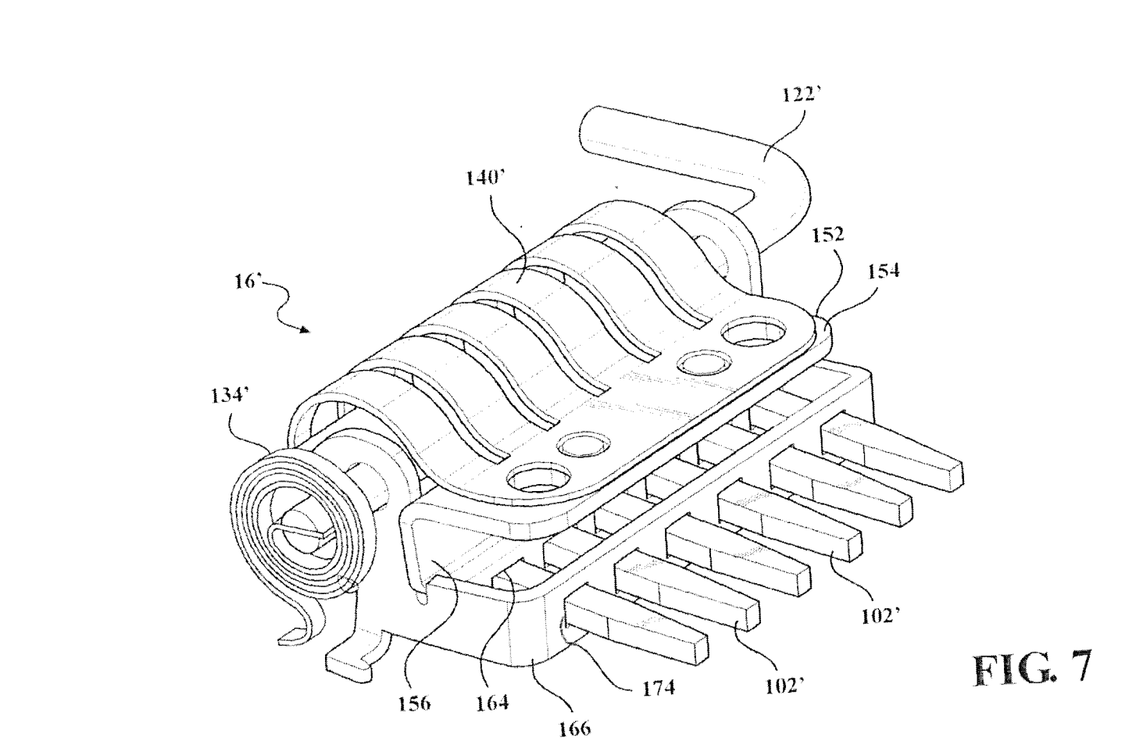
FIG. 7 is a perspective view of the locking mechanism of FIG. 6.
Figure 8:
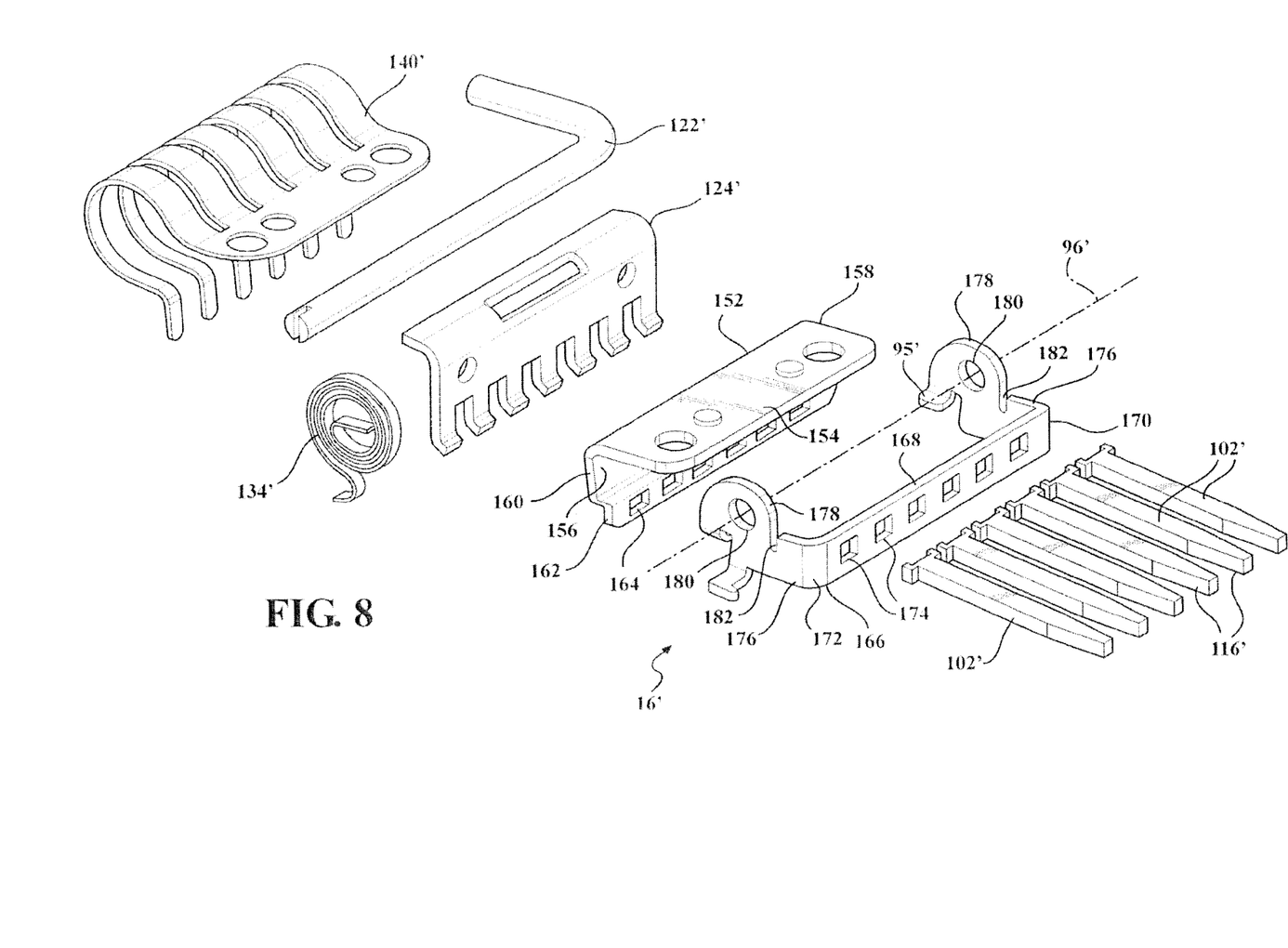
FIG. 8 is an exploded perspective view of the locking mechanism of FIG. 7.

Referring to FIGS. 6 through 8, a second embodiment of the invention is shown, wherein elements of the second embodiment similar to those in the first embodiment are indicated by primed reference characters. The locking mechanism 16' for the track assembly 10' in the second embodiment includes the plurality of pins 102' with the recesses 116', the leaf spring 140' for biasing the pins 102' towards engagement with the locking windows 80', the actuator rod 122' and the actuator lever 124' for moving the pins 102' away from engagement with the locking windows 80', and the clock spring 134' for biasing the actuator rod 122' in the first direction. The clock spring 134' is removed for clarity from FIG. 6. The locking mechanism 16' also includes a mounting bracket 152 having an upper portion 154 adapted to be fixedly secured to the upper web 34' of the upper track 14' and a lower portion 156 extending downwardly from the upper portion 154. The mounting bracket 152 extends longitudinally between first 158 and second 160 ends and a step 162 is formed in each of the first 158 and second 160 ends. A plurality of third apertures 164 is formed in the lower portion 156 of the mounting bracket 152 between the first 158 and second 160 ends thereof. The third apertures 164 are evenly spaced apart and are generally aligned with the first 76' and second 78' apertures when the mounting bracket 152 is fixedly secured to the upper track 14'.

The locking mechanism 16' also includes a retainer bracket 166 having a body 168 extending between first 170 and second 172 ends. As shown in FIGS. 7 and 8, a plurality of fourth apertures 174 is formed between the first 170 and second 172 ends of the body 168. The fourth apertures 174 are evenly spaced apart and are generally aligned with the first 76', second 78', and third 164 apertures for slidably supporting each of the pins 102' therein. An arm 176 extends outwardly from each of the first 170 and second 172 ends of the body 168. The arms 176 extend through the cutout 74' in the first wall 36' of the upper track 14' positioning the body 168 toward the second wall 38'. A distal end 178 of each arm 176 extends upwardly and includes a bore 180. The bores 180 are coaxial and define the pivot axis 96' of the actuator rod 122' and actuator lever 124'. A cavity 182 is defined in each arm 176 adjacent the upwardly extending portion at the distal end 178. The step 162 of the mounting bracket 152 is disposed in the cavity 182 of the retainer bracket 166 when the locking mechanism 16' is assembled.

Referring specifically to FIG. 6, the actuator lever 124' is shown to include angled legs 184, as described above with respect to the first embodiment. The angled legs 184 are adapted to abut the inner tabs 95' on the retainer bracket 166 to stop the actuator lever 124' in the unlocked position.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. In combination, a seat track assembly and a locking mechanism for a seat assembly, said combination comprising: a lower track including a locking window;
   an upper track slidably coupled to said lower track, said upper track including a first aperture; a mounting bracket fixedly secured to said upper track, said mounting bracket including a guide aperture;
   at least one pin slidably guided by said guide aperture of said mounting bracket for movement in and out of said locking window and said first aperture for interlocking said upper and lower tracks, said at least one pin including opposite first and second sides, at least one of said first and second sides including a recess, said recess reducing a surface area of said at least one of said first and second sides of said pin and said recess defining upper and lower edges, wherein said upper and lower edges of said recess lockingly engage with said upper and lower tracks in response to a dynamic impact to prevent withdrawal of said at least one pin from said locking window and said first aperture, wherein said pin extends longitudinally between a first tapered end for movement in and out of said locking window and said first aperture and an opposite second end; and
   an actuator rod rotatably coupled to said mounting bracket and an actuator lever coupled between said actuator rod and said mounting bracket for engaging and withdrawing said pins from said locking window and said first aperture.

2. A combination as set forth in claim 1 further including a leaf spring having a first end fixedly secured to said mounting bracket and a plurality of spring fingers having distal ends engaging respective second ends of said pins for biasing said pins into said locking windows and first apertures.

3. A combination as set forth in claim 2 wherein said each of said pins includes an abutment end for engagement with said actuator lever and an indentation in said second end for engagement with said spring fingers of said leaf spring.

4. A combination as set forth in claim 3 wherein said mounting bracket includes an upper portion for mounting said locking mechanism to said upper track and a lower portion for supporting said pins.

5. A combination as set forth in claim 4 wherein said mounting bracket includes a pair of spaced apart arms having bores for rotatably receiving and supporting said actuator rod.

6. A combination as set forth in claim 5 wherein said mounting bracket includes a retainer portion for slidably supporting and guiding said pins.

7. A combination as set forth in claim 6 wherein said retainer portion defines said guide aperture axially aligned with said locking window and said first aperture each axially receiving said pin between said first and second ends.

8. A combination as set forth in claim 7 further including a clock spring operatively coupled between said mounting bracket and said actuator rod for biasing said actuator lever against said pins.

\* \* \* \* \*